Patented May 4, 1937

2,079,541

UNITED STATES PATENT OFFICE 2,079,541

N-CHLOROSULPHONYLAMIDES AND METHOD FOR THEIR PREPARATION

Martin Battegay, Mulhouse, France, assignor to The Calco Chemical Co., Inc., Bound Brook, N. J., a corporation of Delaware No Drawing. Application July 28, 1932, Serial No. 625,533. In France July 28, 1931

11 Claims.  (Cl. 260—158)

The present invention comprises, in the first place, the preparation of the N-chlorosulphonylamides and the N-chlorosulphonylsulphonamides, classes of compounds as yet unpublished These compounds are characterized by the presence of a chlorosulphonyl radical $SO_2Cl$, attached to the nitrogen atom and correspond to the formula-

R might be an atom of hydrogen, an alkyl or an aryl radical. The acid group represents either a carboxylic acid residue (acyl) or sulphonic acid.

These derivatives are obtained, in general at a low temperature, by the action of sulphuryl chloride on the metal amides, metal sulphonamides, organic metal amides or organic metal sulphonamides, for example, the sodium, potassium, organic magnesium compounds, etc. The process is carried out in the following manner:

The metal amide, metal sulphonamide, organic metal amide or organic metal sulphonamide is introduced into an indifferent anhydrous solvent in a way to form a homogeneous suspension often taking the appearance of a paste. To this is added at low temperature, while stirring, a suitable quantity of sulphuryl chloride diluted with the same solvent. The paste of the metallic derivative thins to the point of an entirely fluid liquid only keeping in suspension the metallic chloride formed in the reaction. This latter is eliminated by filtration or treating with ice water. The filtrate containing the organic solvent is decanted and dried over anhydrous sodium sulphate, and is evaporated to dryness, finally under vacuum.

The residue which contains essentially the amide or sulphonamide of N-chlorosulphonyl, and which is in certain cases slightly resinous, is purified by recrystallization in benzene, carbon tetrachloride, ether, alcohol, etc.

The process is illustrated by the following examples. The most specific details therein are given in connection with the aryl amides and sulphonarylamides, for up to the present time the action of sulphuryl chloride on these substances has resulted only in halogenation of the nucleus. The invention, however, is not limited to these compounds, which are given for illustrative purposes only.

It is suitable to remark that the nature of the acid radical influences the stability of the N-chlorosulphonyl compounds obtained, for example, with respect to the action of water. This last produces in the case of the N-chlorosulphonylamides a decomposition distinctly more rapid than in that of the N-chlorosulphonylsulphonamides. The former absorb, after this decomposition, four alkali equivalents corresponding to the carboxylic, hydrochloric, and sulphuric acids which are formed in conjunction with the amine. The N-chlorosulphonyl-sulphonamides are more resistant, and give rise to the sulphonamide and to hydrochloric and sulphuric acids. The attempt to isolate the free N-sulphonic acids by treating N-chlorosulphonyl amides or sulphonamides first with alkali and then with acid, gives place to the same decompositions. The alkalies always form, in the cold, in aqueous medium, more or less alcoholic to allow solution at this temperature, the alkaline salts of these N-sulphonic acids.

In the action with ammonia, or with primary or secondary amines, the influence of the nature of the acid radical is shown in a particular way, notably in a strictly anhydrous medium.

The N-chlorosulphonyl compounds derived from sulphonic acids are decomposed, under these conditions, and the sulfonamide is easily reformed. The N-chlorosulphonylamides, on the contrary, do not permit the forming of the amide, since there has been an elimination of the acyle radical and formation of an aminosulphonamide of the type:

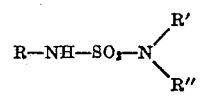

where R' and R'' are either hydrogen atoms or alkyl or aryl radicals, according to whether the amide has reacted with ammonia, primary, secondary, aliphatic or aromatic amines.

The mechanism of the reaction corresponds without doubt to the following equation:

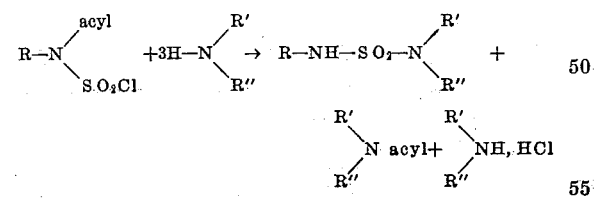

The process following the invention, has allowed the preparation of, for example

| | Degrees |
|---|---|
| N-chlorosulphonylformanilide | M. P. 80 – 81 |
| N-chlorosulphonylacetanilide | 71 |
| N-chlorosulphonylbenzanilide | 109.5–110 |
| N-chlorosulphonyl - p - toluenesulphonanilide | 138.5–139 |
| N-chlorosulphonyl - p - toluenesulphon-o-toluidide | 107.5–108 |
| N-chlorosulphonyl - p - toluenesulphon-m-toluidide | 125.5–126 |
| N-chlorosulphonyl - p - toluenesulphon-p-toluidide | 166 |

EXAMPLE 1

18 parts of formanilide dissolved in 300 parts of benzene or anhydrous ether are added to 3.4 parts of finely divided sodium and heated in a reflux condenser until the entire disappearance of the sodium. In this way a suspension results, to which is added drop by drop, while stirring vigorously, at 0° C. and taking care that the temperature does not fall, 20.2 parts of sulphuryl chloride in 75 cc. of the same solvents mentioned above. The reaction liquor thins and finally does not contain more than the sodium chloride in suspension. This latter is eliminated by filtration. The filtrate is evaporated to dryness under vacuum. A raw product is obtained from which can be got, with a good yield, white crystals melting at 80–81° C.

ANALYSIS

Chlorine

| | | |
|---|---|---|
| Substance weighed | gram | 0.2414 |
| AgCl weighed | gram | 0.1584 |
| Cl found | per cent | 16.23 |
| Cl calculated | per cent | 16.21 |

For $C_7H_6O_3NSCl$

Sulphur

| | | |
|---|---|---|
| Substance weighed | gram | 0.2696 |
| BaSO$_4$ weighed | gram | 0.2845 |
| S found | per cent | 14.50 |
| S calculated | per cent | 14.61 |

For $C_7H_6O_3NSCl$

Nitrogen

| | | |
|---|---|---|
| Substance weighed | gram | 0.009076 |
| V | cc | 0.0513 |
| T | degrees | 19 |
| P | mm | 743 |
| N found | per cent | 6.46 |
| N calculated | per cent | 6.39 |

For $C_7H_6O_3NSCl$

EXAMPLE 2

To 14 parts of acetanilide dissolved in benzene, 2.3 parts of finely divided sodium is added and heated in a reflux condenser until the disappearance of the sodium. To the paste that is obtained there is added, under the same conditions as in Example 1, 13.5 parts of sulphuryl chloride dissolved in 50 parts of benzene. The liquor becomes fluid and a precipitate of sodium chloride is formed which is eliminated by treatment with ice water. The benzene liquor decanted and dried, is evaporated to dryness under vacuum. The residue obtained, slightly resinous, yields on recrystallization from carbontetrachloride, N-chlorosulphonylacetanilide, M. P. 71° C.

ANALYSIS

Chlorine

| | | |
|---|---|---|
| Substance weighed | gram | 0.2913 |
| AgCl weighed | gram | 0.1805 |
| Cl found | per cent | 15.33 |
| Cl calculated | per cent | 15.23 |

For $C_8H_8O_3NSCl$

Sulphur

| | | |
|---|---|---|
| Substance weighed | gram | 0.2613 |
| BaSO$_4$ weighed | gram | 0.2611 |
| S found | per cent | 13.73 |
| S calculated | per cent | 13.73 |

For $C_8H_8O_3NSCl$

Nitrogen

| | | |
|---|---|---|
| Substance weighed | gram | 0.008712 |
| V | cc | 0.0461 |
| T | degrees | 16 |
| P | mm | 743 |
| N found | per cent | 6.11 |
| N calculated | per cent | 6.00 |

For $C_8H_8O_3NSCl$

EXAMPLE 3

By treating 19.7 parts of benzanilide in suspension in ether, with 10.2 parts of propylmagnesium chloride, the propylmagnesium derivative of benzanilide is obtained. There is added, drop by drop, to the suspension of this derivative in ether, at 0° C., 13.5 parts of sulphuryl chloride dissolved in 75 cc. of the same solvent. The magnesium chloride formed is filtered; by the evaporation of the filtrate to dryness under vacuum, a residue of N-chlorosulphonylbenzanilide is obtained which is recrystallized in alcohol. M. P.=108.5–109° C.

ANALYSIS

Chlorine

| | | |
|---|---|---|
| Substance weighed | gram | 0.3052 |
| AgCl weighed | gram | 0.1469 |
| Cl found | per cent | 11.91 |
| Cl calculated | per cent | 12.03 |

For $C_{13}H_{10}O_3NSCl$

Sulphur

| | | |
|---|---|---|
| Substance weighed | gram | 0.1865 |
| BaSO$_4$ weighed | gram | 0.1492 |
| S found | per cent | 10.97 |
| S calculated | per cent | 10.85 |

For $C_{13}H_{10}O_3NSCl$

Nitrogen

| | | |
|---|---|---|
| Substance weighed | gram | 0.009129 |
| V | cc | 0.0397 |
| T | degrees | 19 |
| P | mm | 745 |
| N found | per cent | 4.98 |
| N calculated | per cent | 4.74 |

For $C_{13}H_{10}O_3NSCl$

EXAMPLE 4

2.3 parts of finely divided sodium and 24.7 parts of p-toluene-sulphonanilide dissolved in 700 parts of benzene are heated in a reflux condenser; a thick, gelatinous mass results which is stirred more vigorously. When the sodium has completely disappeared, there is added to the cold reaction product, 13.5 parts of sulphuryl chloride in 50 parts of benzene. The sodium chloride is eliminated by treating with ice water. The benzene liquor is decanted, dried and evaporated to dryness under vacuum. The N-chlorosulphonyl-p-toluenesulphonanilide, M. P. 138.5° C., is separated from the raw product obtained.

ANALYSIS

Chlorine

| | | |
|---|---|---|
| Substance weighed | g | 0.7908 |
| AgCl weighed | g | 0.3338 |
| Cl found | % | 10.44 |
| Cl calculated | % | 10.29 |

For $C_{13}H_{12}O_4NS_2Cl$

Sulphur

| | | |
|---|---|---|
| Substance weighed | g | 0.4372 |
| BaSO$_4$ weighed | g | 0.5904 |
| S found | % | 18.55 |
| S calculated | % | 18.55 |

For $C_{13}H_{12}O_4NS_2Cl$

Nitrogen

| | | |
|---|---|---|
| Substance weighed | g | 0.007490 |
| V | cc | 0.0286 |
| T | °C | 17 |
| P | mm | 730 |
| N found | % | 4.31 |
| N calculated | % | 4.05 |

For $C_{13}H_{12}O_4NS_2Cl$

It is understood that the arylamides which are mentioned in the above cited examples could be replaced by alkylamides or by amides derived from ammonia.

The N-chlorosulphonylamides present, by other means, the particularity of furnishing aminosulphonamides, by treating them in an anhydrous medium with ammonia, primary or secondary amines. The particularity can be illustrated by the following examples:

EXAMPLE 5

Dry ammonia gas, without any trace of humidity is made to bubble into a solution of N-chlorosulphonyl acetanilide of Example 2 in ether or benzene. A precipitate of ammonium chloride, which is filtered, is rapidly formed. The filtrate is evaporated to dryness under vacuum. The residue recrystallized from chloroform is in the form of flakes melting at 108.5–109° C. It is the aminosulphonanilide NH$_2$.SO$_2$.NH.C$_6$H$_5$.

ANALYSIS

Nitrogen

| | | |
|---|---|---|
| Substance weighed | g | 0.00422 |
| V | cc | 0.0608 |
| T | °C | 18 |
| P | mm | 743 |
| N found | % | 16.51 |
| N calculated | % | 16.28 |

For $C_6H_8O_2N_2S$

EXAMPLE 6

To 4.6 parts of N-chlorosulphonylacetanilide dissolved in 50 parts of anhydrous benzene, 7 parts of aniline dissolved in 25 parts of the same solvent is added. The mixture is heated around 50–60° for two hours, allowed to cool, then the aniline hydrochloride is filtered. The excess of aniline in the filtrate is eliminated by treating with dilute hydrochloric acid, then the sulphanilide or more exactly the phenylaminosulphonanilide:

$$C_6H_5NH.SO_2NH.C_6H_5$$

is extracted with dilute caustic soda. This is precipitated from its alkaline solution by hydrochloric acid, filtered, then recrystallized from chloroform or carbon tetrachloride. M. P. 114° C.

The yield in the raw product amounts to 93%.

ANALYSIS

Nitrogen

| | | |
|---|---|---|
| Substance weighed | g | 0.008994 |
| V | cc | 0.0910 |
| T | °C | 20 |
| P | mm | 735 |
| N found | % | 11.40 |
| N calculated | % | 11.29 |

For $C_{12}H_{12}O_2N_2S$

EXAMPLE 7

By replacing the aniline in the preceding experiment with anthranilic acid and working in a medium of boiling toluene, orthocarboxyphenylaminosulphonanilide is obtained:

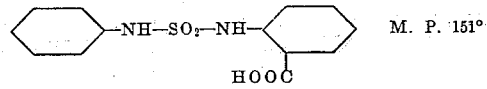

M. P. 151°

ANALYSIS

Nitrogen

| | | |
|---|---|---|
| Substance weighed | g | 0.007662 |
| V | cc | 0.0665 |
| T | °C | 19 |
| P | mm | 723 |
| N found | % | 9.65 |
| N calculated | % | 9.59 |

For $C_{13}H_{12}O_4N_2S$

EXAMPLE 8

In replacing, in Example 5, ammonia by dimethylamine (5 parts of N-chlorosulphonylacetanilide and 3 parts of dimethylamine dissolved in the same solvent cold), a precipitate of dimethylamine hydrochloride, which is filtered, appears after some time. The dimethylacetamide formed in the reaction, which is in the residue, is separated by distillation under vacuum. The dimethylacetamide once eliminated, there remains a viscous oil from which the dimethylaminosulphonanilide is extracted by means of carbon tetrachloride. M. P. 83–84° C.

ANALYSIS

Nitrogen

| | | |
|---|---|---|
| Substance weighed | g | 0.006262 |
| V | cc | 0.0775 |
| T | °C | 21 |
| P | mm | 735 |
| N found | % | 13.90 |
| N calculated | % | 14.00 |

For $C_8H_{12}O_2N_2S$

The reaction course of the phenols and compounds with an enolic function being cloudy in many respects, with the reactivity of the sulphonarylamides, one can, in reasoning by analogy, apply the mechanism of the synthesis which was the question above, to the preparation of chlorosulphonates or chlorosulphonic esters of the formula ClSO$_2$OR, where R represents an aryl radical or a similar radical coming from an enolic compound. These compounds are obtained, in fact, by following the same principle which consists of making the sulphuryl chloride react on the metallic phenates and enolates in indifferent anhydrous medium and at a low temperature. The chlorosulphonic esters which result also constitute a class of unpublished compounds, for one did not recognize until then the corresponding methane derivatives. Their production is illustrated by the following examples:

EXAMPLE 9

One introduces at a temperature of about 0° C., the paste formed by the suspension of 116 parts of phenate, obtained by the action of metallic sodium on phenol in an anhydrous benzene medium, and which represents a volume of almost 5 times its weight, in 160 parts of sulphuryl chloride previously diluted by about 3 times its weight of benzene. The temperature of about 0° C. should be kept during the whole operation. The pasty phenate thins rapidly giving a brown liquid entierly fluid which is finally treated with ice water and slightly alkalinized. The benzene liquor is then decanted, dried with calcium chloride, then submitted to a fractional distillation under vacuum. The phenyl chlorosulphonate formed passes into these conditions at 98° C. under 12 mm. and distills at 221–222° C. under 735 mm.

The composition of the phenyl chlorosulphonate is confirmed by the determination of sulphur and of chlorine as well as by the hydrolysis that it easily undergoes in the warm with the caustic alkalies in giving alkaline phenylsulphate, in its turn split into phenol and sulphuric acid by the action of acids. The chlorosulphonate is more resistant to acids than the phenylsulphate and is easily isolated.

EXAMPLE 10

A solution of 25 parts of guaiacol in 100 parts of anhydrous toluene is added to a toluene solution of 4.5 g. of sodium and 15 parts of ethyl alcohol, then warmed under reduced pressure to eliminate the alcohol, a suspension of sodium guaiacolate results which is introduced little by little into a solution of 30 parts of sulphuryl chloride in 100 parts of toluene held at about −10° C. The suspension thins and gives a brown fluid liquid. This is treated with ice water slightly alkaninized, then the toluene liquor dried, which is then distilled under vacuum. There collects, for example under a vacuum of a mercury pump (less than 1 mm.) at a temperature of 97° C., a colorless liquid the composition of which corresponds to the formula of a chlorosulphonate of ortho-anisyl. This is very stable in regard to water and dilute alkalies in the cold; the alkalies form, warm, ortho-anisylsulphate which is decomposed by acids.

N–chlorosulphonylamides and N-chlorosulphonamides as well as their products of eventual transformation by ammonia, the primary and secondary amines as well as the aryl-chlorosulphonates, ought to be of use in the manufacture of dyes and of intermediates for their preparation.

What I claim is:

1. Sulphonylamides of the formula:

in which A is hydrogen, alkyl or aryl, Y is a monoamino or halogen substituted sulphonic acid, and X is hydrogen or an acidyl group, and in which X is hydrogen and A is alkyl or aryl when Y is amino.

2. Sulphonylamides of the formula

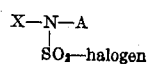

in which X is an acidyl group, and A is hydrogen, alkly or aryl.

3. Sulphonylamides of the formula

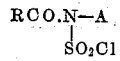

where R is alkyl or aryl and A is hydrogen, alkyl or aryl.

4. Sulphonylamides of the formula

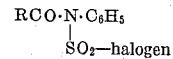

where R is alkyl or aryl.

5. Sulphonylamides of the formula

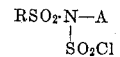

where R is alkyl or aryl and A is hydrogen, alkyl or aryl.

6. Sulphonylamides of the formula

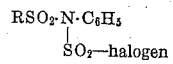

where R is alkyl or aryl.

7. The method of preparing sulphonylamides of the formula

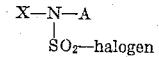

in which X is an acidyl group and A is hydrogen, alkyl or aryl which comprises mixing at low temperatures a sulphuryl halide with a suspension of an amide salt of the formula (X—N—A) Me in which X and A are as above indicated and Me is a metal capable of forming an amide salt, and recovering the sulphonylamide from the reaction products.

8. The method of preparing sulphonylamides of the formula

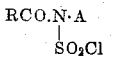

in which R is an alkyl or aryl group and A is hydrogen or an alkyl or aryl group which comprises mixing at low temperatures sulphuryl chloride with a suspension of an amide salt of the formula (RCO·N·A) Me in which R and A are as above indicated and Me is a metal capable of forming an amide salt and recovering the chlorsulphonylamide from the reaction products.

9. The method of preparing sulphonyl-sulphonamides of the formula

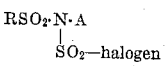

in which R is an aryl or alkyl group and A is hydrogen or an aryl or alkyl group which comprises mixing at low temperatures a sulphuryl halide with a suspension of an amide salt of the formula (RSO₂·N·A) Me in which R and A are as above indicated and Me is a metal capable of forming an amide salt and recovering the sulphonyl-sulphonamide from the reaction products.

10. The method of preparing aminosulphonamides of the formula

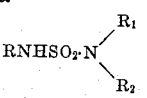

in which R is alkyl or aryl and either or both of R₁ and R₂ are hydrogen, alkyl or aryl which comprises reacting a compound of the group consisting of ammonia, primary and secondary amines with a sulphonylamide of the formula

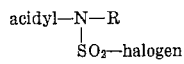

in which R is as above indicated, and recovering the aminosulphonamide from the reaction products.

11. The method of preparing an aminosulphonanilide of the formula

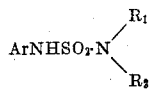

in which Ar is a phenyl group which comprises reacting in the substantial absence of water a compound of the group consisting of ammonia, primary and secondary amines with a sulphonylamide of the formula

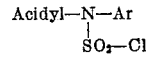

in which Ar is as above indicated, and recovering the aminosulphonanilide from the reaction products.

MARTIN BATTEGAY.

CERTIFICATE OF CORRECTION.

Patent No. 2,079,541.   May 4, 1937.

MARTIN BATTEGAY.

It is hereby certified that error appears in the printed specification of the above numbered patent requiring correction as follows: Page 4, first column, line 51, Example 10, for the syllable "phonamides" read phonylsulphonamides; and that the said Letters Patent should be read with this correction therein that the same may conform to the record of the case in the Patent Office.

Signed and sealed this 18th day of January, A. D. 1938.

Henry Van Arsdale,
(Seal)   Acting Commissioner of Patents.